United States Patent [19]
Snyder et al.

[11] Patent Number: 5,535,768
[45] Date of Patent: Jul. 16, 1996

[54] METHOD AND APPARATUS FOR REDUCING DAMPER OPERATING PRESSURE

[75] Inventors: Robert E. Snyder, Green, Ohio; Paul J. Williams, Franklin Township, Summit County, Ohio

[73] Assignee: The Babcock & Wilcox Company, New Orleans, La.

[21] Appl. No.: 209,022

[22] Filed: Mar. 10, 1994

[51] Int. Cl.⁶ ..................................................... G05D 7/00
[52] U.S. Cl. ...................... 137/12; 137/599.1; 137/115.2; 137/115.3; 422/49; 261/109
[58] Field of Search ................................ 137/115, 599.1, 137/240, 1, 2, 12; 422/49; 261/23.1, 109

[56] References Cited

U.S. PATENT DOCUMENTS 4,239,711  12/1980  Dick et al. .......................... 422/49 X

*Primary Examiner*—John Rivell
*Attorney, Agent, or Firm*—Robert J. Edwards; Michael L. Hoelter

[57] ABSTRACT

A method and apparatus for venting the seal air pressure within an isolated system so as to obtain a relatively small, in the range of 4 to 8 inches water gauge more or less, pressure differential across the isolation dampers. This small pressure differential is desired so as to reduce the load against which the dampers must operate thereby permitting a more economical design of such dampers.

10 Claims, 1 Drawing Sheet

METHOD AND APPARATUS FOR REDUCING DAMPER OPERATING PRESSURE

FIELD OF THE INVENTION

This invention pertains, in general, to process equipment that is isolated via flue dampers and more specifically to a means of reducing the air pressure differential across such dampers prior to operation.

BACKGROUND OF THE INVENTION

It is common to isolate many different types of gas process equipment for such purposes as maintenance, inspection, etc. When such isolation occurs or is desired, dampers in the gas flow path are actuated to seal or isolate this process equipment from the main process gas flow path. Oftentimes, the diverted flow travels through a by-pass or it can be sent to other parallel process equipment or such gas flow can be decreased, or is already low, so as to accommodate the removal of the isolated equipment from operation.

Upon such isolation, seal air fans are normally activated to pressurize the isolated equipment thereby creating a positive pressure difference across the seal dampers. This insures that no leakage into the isolated equipment will occur. Generally, the design seal air pressure in such an isolated system is typically set above the highest possible operating pressure obtainable in the main process gas flow path to insure that no leakage into the isolated system will occur. Normally, however, the actual pressure within the main process gas flow path will be considerably less than this highest possible operating pressure thereby resulting in a vast pressure difference across the closed dampers due to the even higher seal air pressure. It is this pressure difference which must be overcome whenever the dampers are to be opened and the process equipment is to be brought back on-line.

For example, it is not uncommon for gas process equipment to have a maximum operating pressure of 15 inches water gauge thereby warranting a seal air pressure of about 20 inches water gauge after upsets and other factors are taken into consideration. However, during periods of low demand when it is likely that a module will be removed from service, the actual operating pressure in the main gas flow path can, in reality, be as low as 1 inch water gauge. Thus, the resulting pressure differential across the dampers between the actual low main gas flow path operating pressure and the high seal air pressure will be as high as 19 inches water gauge. This is a large pressure difference that must unnecessarily be maintained by the dampers when, in fact, a much lower pressure difference, such as in the 4 to 8 inch water gauge range more or less, will suffice to maintain a proper seal. Furthermore, when the time comes to open the dampers, they must push or operate against this large seal air pressure thereby requiring larger and stronger dampers and related motors and/or drivers.

In other systems, the maximum operating pressure of the main gas flow path can be in the 20–30 inches of water gauge range thereby warranting an even higher seal pressure when, in fact, the actual operating pressure may, in reality, be considerably less.

Because such isolated systems are to be pressurized, it is common to install an overpressurization relief valve to prevent the isolated module from becoming too pressurized. Such a relief valve is of no use in the present situation since these relief valves are designed to operate only upon reaching or exceeding a preset maximum pressure value, they are not designed to limit or maintain the seal air pressure to only a few inches water gauge above or relative to the pressure on the other or main gas flow path side of the damper.

Thus, these overpressurization relief valves merely insure that the module's design pressure is not exceeded by the operation of the seal fans. They are configured so as not to open until overpressurization occurs and their vents are sized to hold the module at the designated seal air pressure if need be.

It is thus an object of the present invention to provide a means of maintaining a pressure difference across the closed seal dampers of only a few inches water gauge, say about 4 to 8 inches water gauge, more or less. While it is not expected that this pressure difference will vary, the actual value of the seal air pressure may vary as this value is a function of the actual operating pressure in the main gas flow path. It is another object of this invention to prevent overpressurization of the isolated module from occurring and to release such pressure if overpressurization does, indeed, occur. Still another object of the present invention is to provide a means of reducing the pressure of the isolated module prior to damper operation. Yet another object of the present invention is to reduce the size and power requirements of such isolation dampers. These and other objects and advantages of the present invention will become obvious upon further investigation.

SUMMARY OF THE INVENTION

Figure 1:
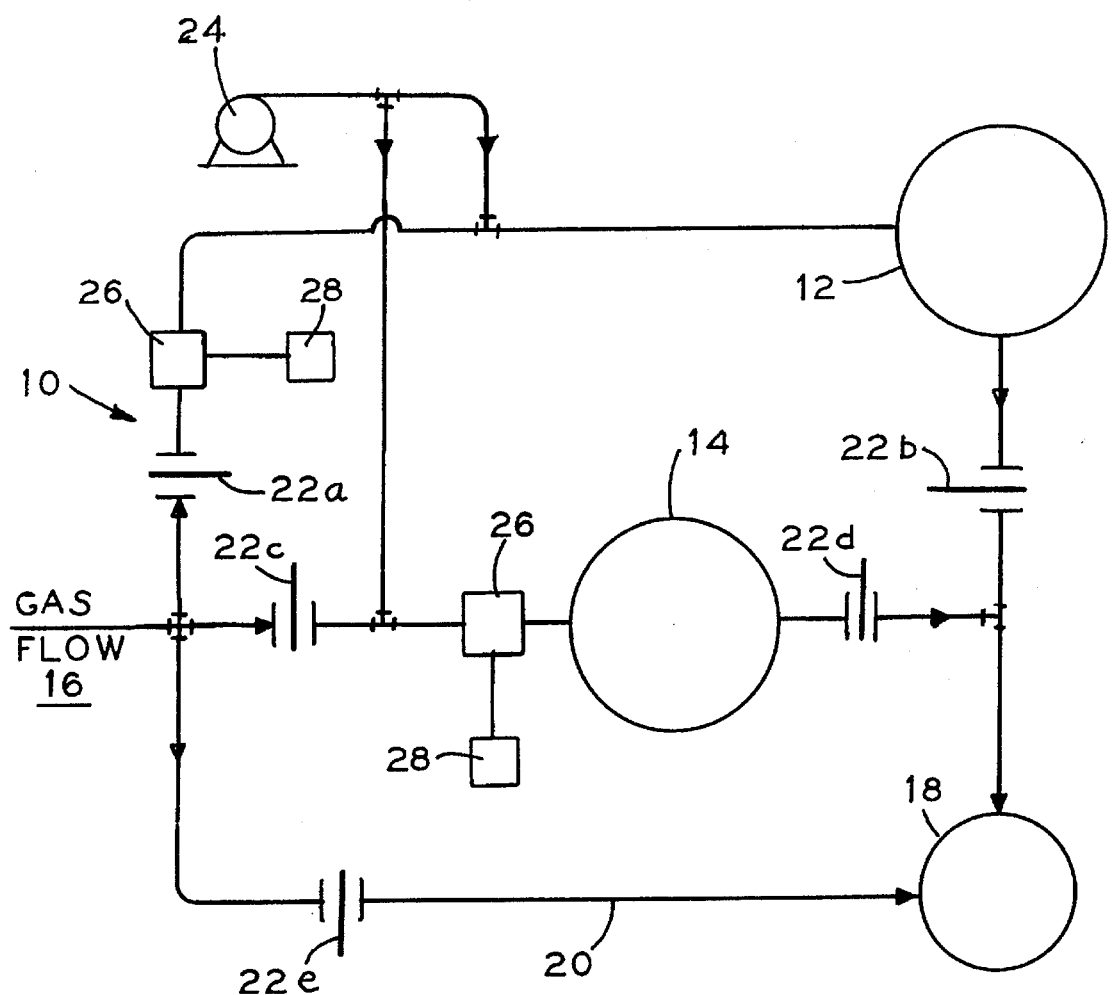
FIG. 1 is a schematic diagram of an absorber module and flue gas flow arrangement, including by-pass, incorporating the invention therein.

This invention pertains to a method and apparatus for releasing pressure from a pressurized, isolated assembly. This isolated assembly will generally incorporate a module, isolation means for isolating the module from a gas flow path, and seal air supply means for pressurizing the isolated assembly when the isolation means are activated. The improvement consists of installing venting means which are used to reduce the pressure within the isolated assembly to a level of a few inches water gauge, optionally 4 to 8 inches more or less, above the pressure of the gas flow path thereby maintaining a relatively small positive pressure differential across the isolation means regardless of the actual operating pressure in the gas flow path.

DETAILED DESCRIPTION OF THE DRAWING

Referring to FIG. 1, there is shown system 10 which comprises first absorber module 12 and second absorber module 14. These absorber modules 12 and 14 are positioned in a parallel arrangement between flue gas conduit 16 and stack 18. Other arrangements of modules 12 and 14 are equally likely, the arrangement shown here being merely for purposes of explanation. Not shown but also generally included in system 10 would be the gas-gas heaters, fans, etc. necessary for the operation of system 10. A by-pass flow path 20 is also illustrated which is used when one or both modules 12 and 14 are to be removed from service.

Isolation dampers 22a–22e, located where shown, are selectively opened and/or closed depending on the desired flow through system 10. Additionally, a seal air fan 24 is used to provide the desired degree of pressurization to any of modules 12 and/or 14 which have been isolated.

During periods of low flue gas flow, it may be desired to remove one of modules 12 or 14 from further service. This may be due to low demand, required maintenance and/or inspection, or other repair/preventive work necessary to maintain the operation of modules 12 or 14. Such isolation may also be required in the event of a mechanical break down or the occurrence of an upset condition. Assuming for the moment that module 12 is to be isolated from system 10, isolation dampers 22a and 22b on either side of module 12 would be closed and seal air fan 24 would be activated so as to supply seal air to this isolated module 12. In this event, isolation dampers 22c and 22d on either side of module 14 would, in all likelihood, remain open while isolation damper 22e associated with by-pass 20 would remain closed. However, in the event the gas flow to operating module 14 becomes too great, by-pass isolation damper 22e may then be opened.

Referring now more specifically to isolated module 12, seal air fan 24 will operate to pressurize this module 12 to a design seal air pressure value that exceeds the maximum operating pressure of system 10. This is due to the fact that during such isolation, it is desirable for the pressure to be greater on the module side of closed dampers 22a and 22b and less on the by-pass or stack side of these closed dampers. Ideally, there need only be a few inches water gauge difference between the two pressures to maintain the seal between isolated module 12 and the main gas flow path.

Generally, the maximum operating pressure of system 10 can be any value, but for purposes of discussion, this value will be presumed to be in the range of 15–30 inches water gauge, more or less. Thus, the pressure value to which seal air fan 24 must pressurize isolated module 12 must, by necessity, exceed this preset design value so as to always insure a positive pressure on the module side of dampers 22a and 22b. If the seal air pressure did not exceed this maximum operating pressure of system 10, then in some cases, it would not be possible to isolate module 12 since leakage would occur into the isolated system. Also, such an artificially high seal air pressure value is required since the actual operating pressure existing during such isolation can always vary and is never known with any degree of certainty. Thus, the requirement that the seal air pressure always exceed the maximum design opera-ting pressure of the main gas flow path.

However, as is often the case, the actual operating pressure within flue gas conduit 16, module 14, and/or by-pass 20 (if utilized), i.e. the main gas flow path, will oftentimes be considerably less than its designed maximum operating pressure. In some cases the actual operating pressure within the main gas flow path will or can be as low as one inch water gauge. Consequently, should such a low operating pressure actually occur, there will exist a tremendous pressure differential across closed isolation dampers 22a and 22b due to the artificially high value of the seal air pressure which was set so as to insure, in every case, a positive pressure difference across dampers 22a and 22b. In the example above, this pressure differential can approach or exceed 29 inches water gauge.

It should be noted that the maximum operating pressure value and the even greater seal air pressure value are normally values which are preset during the design stage of the module. Once set, they will experience little variation as they are the designed values. However, in reality, there need only be a few inches water gauge across closed dampers 22a and 22b to insure a proper seal, any greater differential will merely provide diminishing returns and will generally result in the waste of material and energy.

The present invention provides for a vent 26 operated by control 28 that opens prior to the opening of any closed isolation dampers 22 and which is sized to reduce the pressure within isolated module 12 to the minimum required to seal system 10. This minimum requirement is, as stated above, typically in the range of only a few inches water gauge, say 4 to 8 inches water gauge, more or less. By thus reducing the pressure differential across closed dampers 22a and 22b, the size and power requirements of operating these closed dampers are minimized. While the designed seal air pressure value and the designed operating pressure value are usually somewhat fixed, the actual operating pressure of the main gas flow path will vary and thus the actual pressure required in isolated module 12 will vary, this pressure needing to be only a few inches water gauge above the actual operating pressure in the main gas flow path.

In typical flue gas desulfurization systems, when a module, such as module 12, is removed from service for whatever reason, the associated seal air fan 24 will begin operation to maintain this isolated module 12 at the high seal air pressure value. As stated above, this seal air pressure value is artificially high so as to exceed the value of the combination of the overdesign of each and every fan system involved in system 10, such as the ID, booster, and seal air fans. It should be understood that each of these fans have margins called test blocks that, when combined, may add up to a potential pressure in isolated module 12 of 50–70% over its design operating pressure value. Thus, dampers 22a and 22b must be properly designed and sized to operate against such an artificially high pressure.

According to this invention, however, vent 26 is activated to relieve and reduce such pressure difference prior to damper operation thereby leading to the design of smaller dampers 22 that require less energy to operate. This invention pertains to the specific release of artificially high seal air pressure within a module for the purpose of reducing damper operating pressure.

A typical operation of system 10, and more particularly vent 26 and control 28, would only occur after a module (here module 12) has been isolated by dampers 22a and 22b. In this case, seal air fan 24 would be activated to pressurize module 12 to the relatively high preset seal air pressure value regardless of the actual pressure existing in flue gas conduit 16 (which varies depending on operating conditions). However, once module 12 no longer needs to be so isolated, and before dampers 22a and 22b would be opened to bring module 12 once again on-line, vent 26 would be operated (i.e. opened) by control 28 so as to bring the pressure within module 12 to only a few inches water gauge above that actually existing in flue gas conduit 16. By this release of the pressure above these few inches water gauge from isolated module 12, dampers 22a and 22b now need only operate (i.e. open) against a smaller pressure differential thereby enabling such dampers to be smaller in size which subsequently requires less energy for their operation. In the past, such dampers were designed to operate against the artificially high value of the seal air pressure maintained by fan 24 regardless of the pressure actually existing on flue gas conduit 16 side of the damper. Thus, this invention now enables such dampers to operate against only a few inches water gauge of pressure rather than some artificially high pressure difference maintained across the dampers.

This is accomplished by control 28 ascertaining and monitoring the pressure within both flue gas conduit 16 and the isolated module 12 and then operating vent 26 accordingly so as to achieve only a few inches water gauge between the two. Thus, when operating conditions are such that the pressure within flue gas conduit 16 is at a maximum, the pressure difference between this maximum operating pressure and the preset seal air pressure maintained by fan 24 will already be only a few inches water gauge. Hence, control 28 will not operate vent 26 under these conditions as the pressure differential across dampers 22 will already be within the desired range to be achieved by control 28.

However, should the operating conditions within flue gas conduit 16 be at a minimum (i.e. such as an inch water gauge as described above), then the pressure difference between this minimum operating pressure and the seal air pressure would, in the example described above, be as high as 29 inches water gauge or more. In such a situation, control 28 would sense this large pressure difference existing across dampers 22 and would operate vent 26 so as to relieve such excess pressure from module 12 until this pressure differential is reduced to within the acceptable range of only a few inches water gauge. Upon such pressure reduction (remember, seal air fan 24 is still continuously attempting to pressurize the isolated module 12 to the artificially high seal air pressure), control 28 would then adjust vent 26, such as by closing them or reducing their venting capacity, so that the pressure difference on both sides of damper 22 would remain within the selected range of only a few inches water gauge.

As can be imagined, as the actual operating pressure occurring in flue gas conduit 16 varies, the slightly higher pressure in isolated module 12 also varies accordingly. Upon achieving the desired pressure difference across dampers 22 of only a few inches water gauge, dampers 22a and 22b would be permitted to open so that they now will only operate under a relatively small pressure difference rather than a much higher, artificially maintained pressure difference.

In some cases, the operation of vent 26 would be intermittent such as when the operating pressure within flue gas conduit 16 is at or near its maximum operating pressure. At other times, the operation of vent 26 would be continuous such as when the operating pressure within flue gas conduit 16 is operating at a more normal (i.e. lower) pressure.

As indicated above, this seal air pressure value is usually preset and remains relatively constant with fan 24 operating to maintain this high pressure value in the isolated module. However, vent 26 is selectively operated to release such high seal pressure in the isolated module so that the pressure actually acting on the module side of dampers 22 is only a few inches water gauge above the operating pressure occurring on the flue gas conduit 16 side of dampers 22. Since the actual operating pressure within the flue gas conduit 16 varies, vent 26 will operate to selectively release pressure from the isolated module thereby causing the pressure within this isolated module to likewise vary.

What is claimed is:

1. An apparatus for releasing pressure from an isolated assembly wherein the isolated assembly incorporates a module, isolation means for isolating the module from a gas flow path, and seal air supply means comprising one or more seal air fans for pressurizing the isolated assembly when the isolation means are activated, wherein the improvement comprises:

(a) damper valves forming a part of the isolation means, said damper valves being located both upstream and downstream the module and being selectively opened and closed;

(b) venting means for reducing the pressure within the isolated assembly to a level a few inches water gauge above the pressure of the gas flow path thereby resulting in a relatively small positive pressure differential across said damper valves, the pressure within the isolated module thus varies depending on the pressure of the gas flow path, said venting means being secured intermediate one said damper valve and the module; and, (c) control means for operating said venting means prior to opening said damper valves.

2. The apparatus as set forth in claim 1 wherein the module is a flue gas desulfurization absorber module.

3. The apparatus as set forth in claim 1 wherein said venting means are continuously operated upon the isolation of the assembly.

4. The apparatus as set forth in claim 1 wherein said venting means are selectively operated upon the isolation of the assembly.

5. The apparatus as set forth in claim 1 wherein the said few inches water gauge is 4 to 8 inches, more or less.

6. A method of releasing pressure from an isolated assembly wherein the isolated assembly incorporates a module, isolation means for isolating the module from a gas flow path, and seal air supply means comprising one or more seal air fans for pressurizing the isolated assembly when the isolation means are activated, wherein the improvement comprises the steps of:

(a) installing damper valves which form a part of the isolation means both upstream and downstream the module, said damper valves being selectively opened and closed thereby selectively isolating the module from the gas flow path; and, (b) venting or reducing the pressure within the isolated assembly to a level a few inches water gauge above the pressure of the gas flow path via a venting assembly, said venting assembly being operated prior to opening said damper valves and being located intermediate one said damper valve and the module, the pressure within the isolated module thus varying depending on the pressure of the gas flow path thereby resulting in a relatively small positive pressure differential across said damper valves.

7. The method as set forth in claim 6 further comprising the step of configuring the module as a flue gas desulfurization absorber module.

8. The method as set forth in claim 6 further comprising the step of continuously operating said venting means upon the isolation of the assembly.

9. The method as set forth in claim 6 further comprising the step of selectively operating said venting means upon the isolation of the assembly.

10. The method as set forth in claim 6 further comprising the step of reducing the pressure within the isolated assembly to a level 4 to 8 inches water gauge, more or less, above the pressure of the gas flow path.

* * * * *